June 3, 1958     R. C. LEGAT     2,837,136
MACHINE FOR MAKING GARMENT FASTENER TRACKS
Filed Nov. 29, 1955     12 Sheets-Sheet 1

FIG.1

INVENTOR.
ROBERT C. LEGAT
BY
ATTORNEYS

*INVENTOR.*
ROBERT C. LEGAT

BY

ATTORNEYS

INVENTOR.
ROBERT C. LEGAT

BY

ATTORNEYS

June 3, 1958 R. C. LEGAT 2,837,136
MACHINE FOR MAKING GARMENT FASTENER TRACKS
Filed Nov. 29, 1955 12 Sheets-Sheet 7

INVENTOR.
ROBERT C. LEGAT
BY
ATTORNEYS

June 3, 1958 R. C. LEGAT 2,837,136
MACHINE FOR MAKING GARMENT FASTENER TRACKS
Filed Nov. 29, 1955 12 Sheets-Sheet 8

INVENTOR.
ROBERT C. LEGAT
BY
ATTORNEYS

June 3, 1958 R. C. LEGAT 2,837,136
MACHINE FOR MAKING GARMENT FASTENER TRACKS
Filed Nov. 29, 1955 12 Sheets-Sheet 11

INVENTOR.
ROBERT C. LEGAT
BY
ATTORNEYS

June 3, 1958 R. C. LEGAT 2,837,136
MACHINE FOR MAKING GARMENT FASTENER TRACKS
Filed Nov. 29, 1955 12 Sheets-Sheet 12

INVENTOR.
ROBERT C. LEGAT
BY
ATTORNEYS

United States Patent Office 2,837,136
Patented June 3, 1958

2,837,136

MACHINE FOR MAKING GARMENT FASTENER TRACKS

Robert C. Legat, New Britain, Conn., assignor to The G. E. Prentice Manufacturing Company, Kensington, Conn., a corporation of Connecticut Application November 29, 1955, Serial No. 549,596

15 Claims. (Cl. 153—1)

The invention relates to a machine for making tracks for garment fasteners of the type comprising a cooperating member which is adapted to be secured selectively in various adjusted positions on the track. The tracks which may be made on the machine of this invention, are each composed of a flexible supporting member, such as a tape, to which has been attached a series of spaced pairs of steps engageable by a releasable clamping or locking member provided on the aforesaid cooperating member, and are of the character shown in my pending application Serial No. 459,086, filed September 29, 1954 for Adjustable Fastening Device.

Fasteners of the indicated type are used extensively on the waistbands of dungarees which are inexpensive and subjected to severe usage both by the wearer and the commercial laundry. One of the objects of the present invention is to provide a machine which can make complete tracks for such fasteners at a very low cost on a quantity basis and of such sturdy construction that they will not readily become damaged or rendered inoperative while in use or when subjected to the washing and mangling operations employed in commercial laundering.

Another object of the invention is to provide an improved machine of the indicated type which is relatively simple and compact in construction, which is relatively inexpensive to construct and operate, and which is wholly automatic in performing its sequence of operations to make complete tracks.

Other objects, as well as the advantages of the invention will become apparent from a perusal of the following detailed description of the machine, when read in connection with the accompanying drawings, in which.

Figure 5:
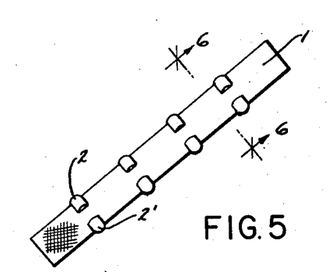
Fig. 5 is a perspective view showing a fastener track which can be made on the machine of this invention.
Figure 6:
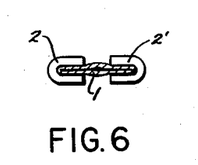
Fig. 6 is a transverse sectional view of the track shown in Fig. 5.

The particular embodiment of the invention illustrated in the drawings is constructed to manufacture the form of fastener track illustrated in Figs. 5 and 6 of the drawings. As shown in these figures, the track consists of a section of tape 1 which may be constituted of an outer layer of tubularly woven tape material and an inner core of cord or other suitable material, the tape material and core being flattened to provide a flat section approximately one-sixteenth of an inch thick. Clamped to the longitudinal side edges of the tape section are four pairs of stop members, each pair consisting of stop members 2, 2' and each such stop member being constituted of a section of wire bent into a U-shaped form to provide two parallel legs which are clamped to the tape 1. As indicated in Figs. 5 and 6, the legs of the stop members have an outer arcuately-shaped surface and a plane surface so that they are convexly-shaped in cross-section and have their major thickness along the longitudinal central portion thereof.

Figure 1:
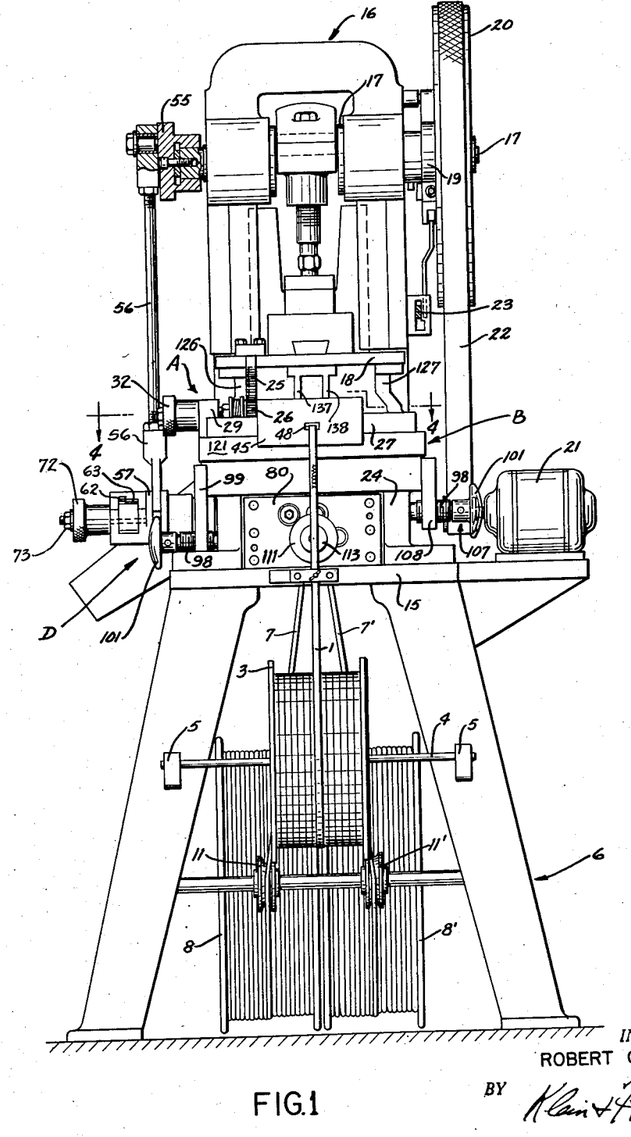
Fig. 1 is a front elevation of a machine constructed in accordance with the invention.
Figure 2:
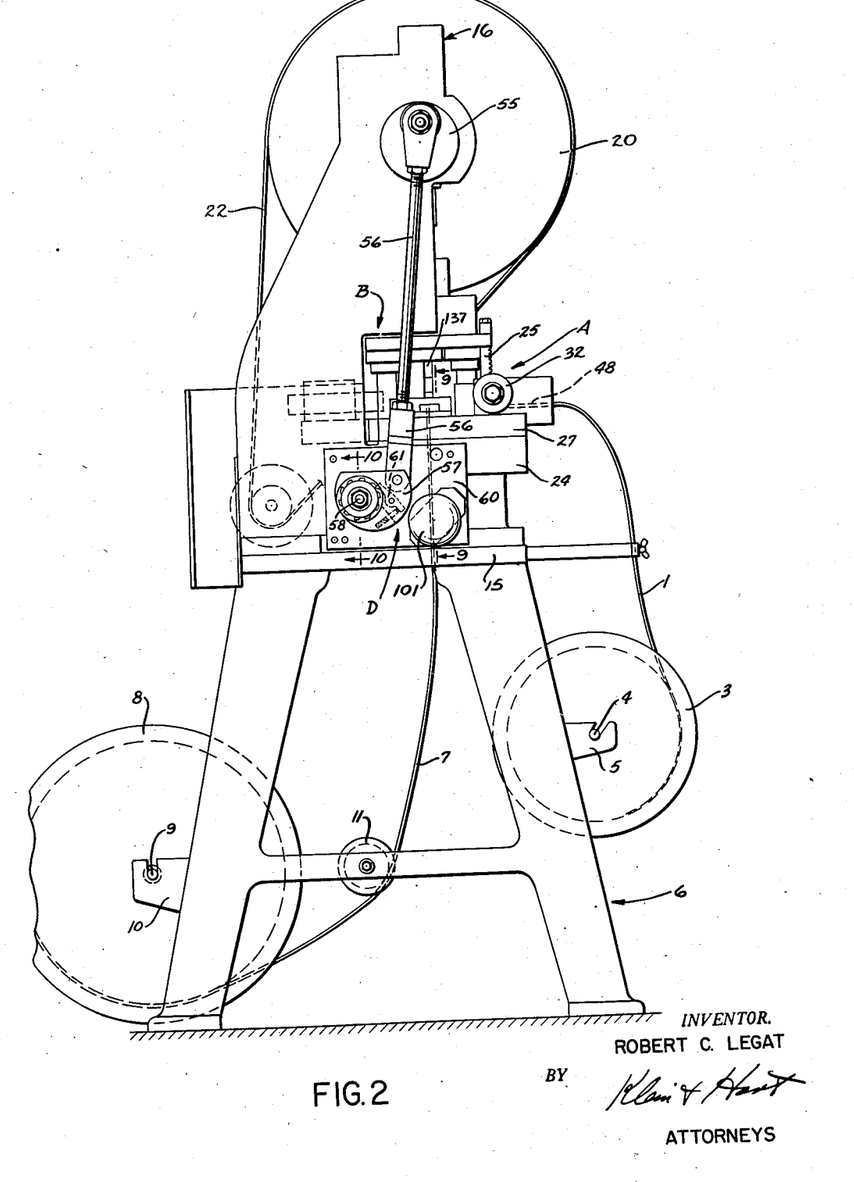
Fig. 2 is a side elevational view of the machine looking toward the left side of Fig. 1.
Figure 3:
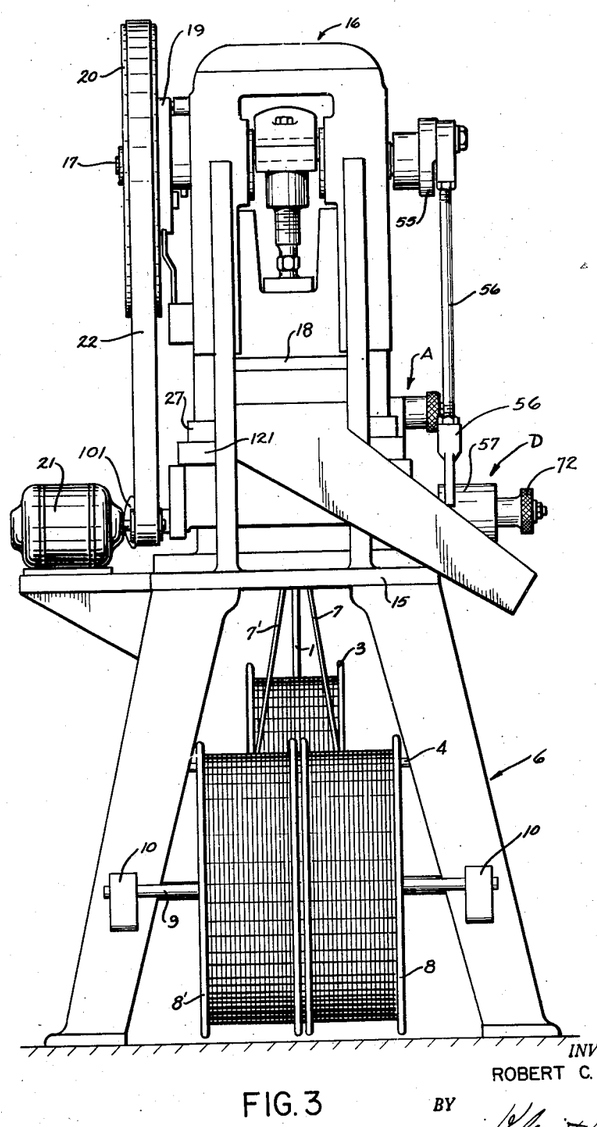
Fig. 3 is a rear elevational view of the machine.
Figure 4:
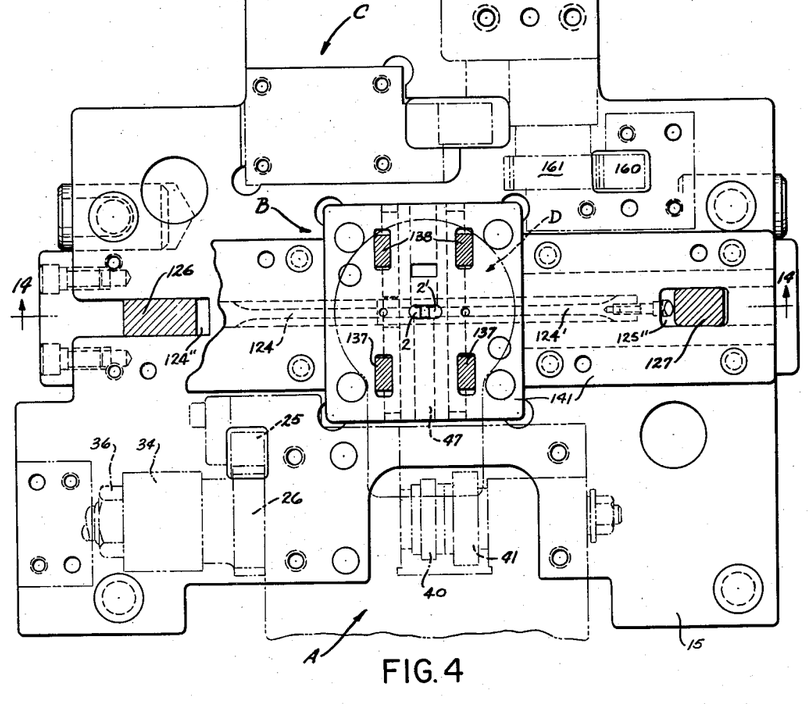
Fig. 4 is a plan view of the machine bed, the view being taken approximately along the line 4—4 of Fig. 1 and showing the relative positions of the cooperating units.

As is shown in Figs. 1 to 3, the tape 1 is fed to the operating parts of the machine from a suitable source such as a roll or reel 3 mounted on a shaft 4 rotatably supported by brackets 5 provided on the front legs of the machine base generally designated 6. The tape 1 passes from the reel 3 through a tape feed unit which is generally designated A and which intermittently draws the tape from such reel and feeds the advanced end thereof through a stop element forming unit generally designated B and to a tape severing unit generally designated C (note Fig. 4). The stop elements 2 and 2' are formed from supply lengths of wire 7, 7', respectively, fed from rolls or reels 8, 8', respectively, mounted on a shaft 9 rotatably supported by brackets 10 provided on the rear legs of the base 6. The wires 7, 7' are fed from the reels 8, 8', respectively, over grooved rollers 11, 11', respectively, which may be formed to straighten the wires so that they are free of kinks. The wires then pass through a feeding device generally designated D and which intermittently draws the wires through the wire straightening rollers 11, 11' from the supply reels and simultaneously feeds the advanced ends thereof into the forming unit B which simultaneously cuts advance sections from both the wires, simultaneously forms such sections into U-shape and then simultaneously attaches the formed members to opposite sides of the tape. The machine is set to attach four pairs of the stop elements at equally spaced places and then advance the tape the distance of two spaces without attaching a pair of stops so that when the tape is cut at the middle of such double spaces, the ends of a finished track are spaced from the end pairs of stop members a distance equal to the distance between pairs of such members.

Figure 7:
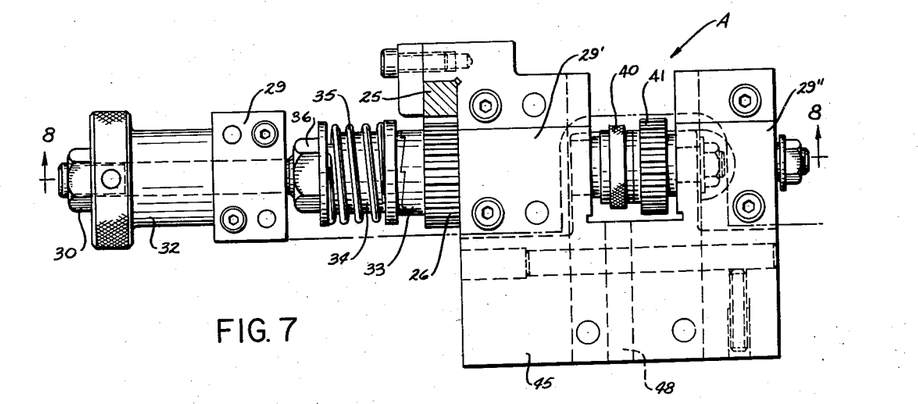
Fig. 7 is a top plan view of the tape feed unit.
Figure 8:
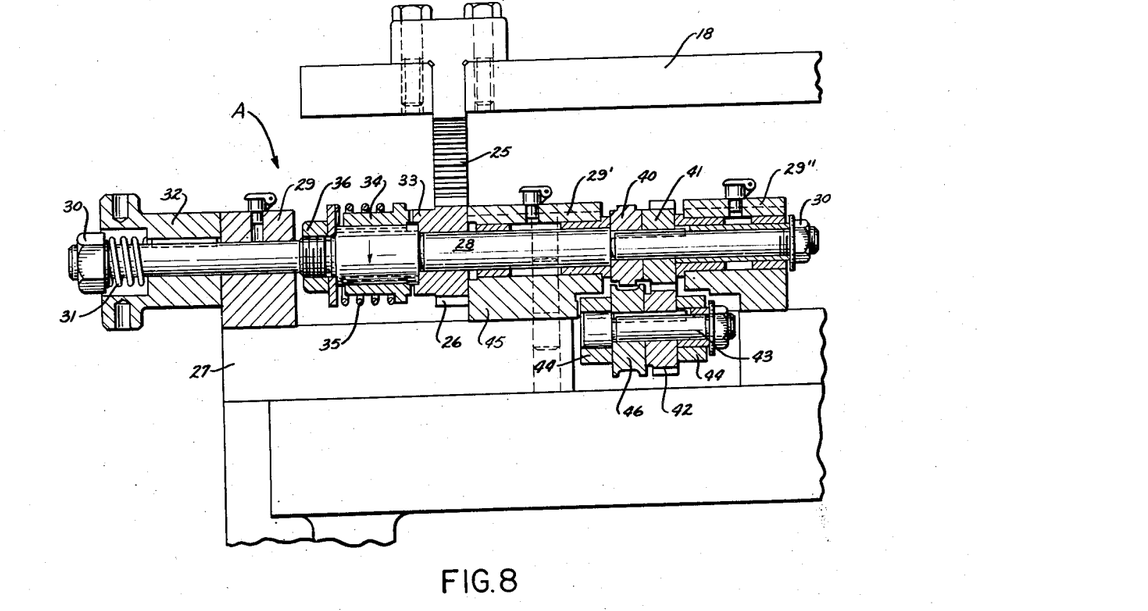
Fig. 8 is a vertical sectional view of the tape feed unit taken along the line 8—8 of Fig. 7.

As is shown in Figs. 1 to 4 of the drawings, the base 6 of the machine supports a bed 15 upon which is mounted the several coacting mechanisms including a press of standard construction which is designated generally by the reference number 16. As is usual, the crankshaft 17 rotatably supporting the ram 18 of the press is connected by a clutch 19 of standard construction to a fly wheel 20 which is driven by a motor 21 through a belt 22. In standard presses of the type indicated in the drawings, when the motor is operating and driving the flywheel, the rotational movement of the latter is transmitted to the shaft by manually moving a handle 23 down to cause the clutch 19 to lock the flywheel to such shaft. During the rotational movement of crankshaft 17, the wire and tape are advanced through the machine as the ram 18 is moving upwardly, while the cutting, forming and attachment of the stop elements to the tape occur on the downward strokes of the ram. As is shown more clearly in Figs. 1, 7 and 8, the ram 18 is connected to the tape feed unit A by a depending rack 25 which is fixed at its upper end to the ram in any suitable manner, as by bolts, and which engages and drives gear 26 of the tape feed unit. The tape feed unit is mounted on a raised plate 27 supported on the base 24 of the frame in which the ram operates and is composed of a shaft 28 on which the gear 26 is rotatably mounted. The shaft 28 is rotatably supported by bearings 29, 29' and 29'' mounted on plate 27 and is adjustable lengthwise with respect to such bearings by adjustment of the nuts 30, 30' threadedly engaging the ends of such shaft. Nut 30' bears against a sleeve in bearing 29'' under the tension of a spring 31 seated between nut 30 and a hand knob 32. The gear 26 is provided with ratchet teeth 33 which engage with the teeth of a ratchet 34 keyed to the shaft 28 for longitudinal movement relative thereto. The ratchet 34 is maintained in engagement with the ratchet gear 26 by a spring 35 located between a bead on ratchet 34 and a washer held in position by a nut 36 adjustably threaded on shaft 28. It will be noted from Fig. 7 of the drawings, that the teeth of the clutch formed by gear 26 and ratchet 34 are constructed so that gear 26 is rotated on shaft 28 by rack 25 without imparting movement to ratchet 34 and shaft 28 in the downward strokes of ram 18 and rack 25, and that gear 26 is drivingly connected to ratchet 34 and shaft 28 during the upward movements of ram 18 to rotate shaft 28 in the direction of the arrow shown in Fig. 8.

Figure 16:
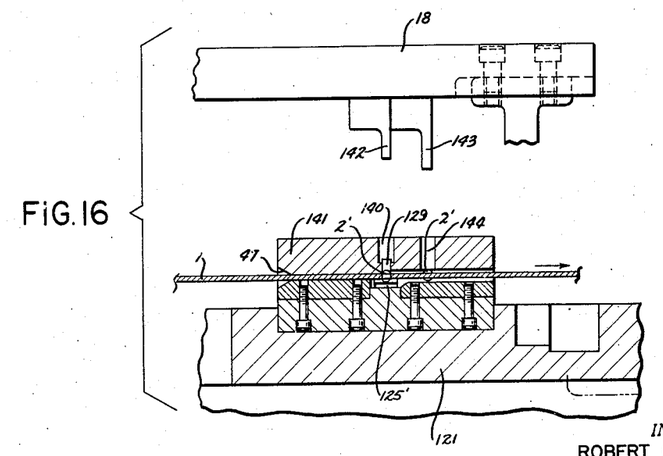
Fig. 16 is a sectional view of the tape guide taken along the line 16—16 of Fig. 14.

Keyed to shaft 28 between the bearings 29' and 29'' are a tape feed roll 40 and a feed roll gear 41, the latter being in mesh with a gear 42 keyed to a stub shaft 43 rotatably supported by a yoke 44 formed on the body of the bearing block 45 providing bearings 29' and 29''. Also keyed to stub shaft 43 is a driven feed roll 46 positioned in alignment with the driver feed roll 40. It will be noted from Figs. 7 and 8 of the drawings that the peripheral surface of driven roll 46 is channel shaped and that roll 40 has a reduced, knurled peripheral portion which is received in the channel of roll 46. As a result of this construction, the tape which is drawn by rolls 40 and 46 from the reel 3 and along a trough 48 formed in the body of block 45, will be positively gripped and under the control of rolls 40 and 46 so that predetermined, equal, unit lengths of the tape will be accurately fed into the entry end of a tape guide passageway 47 formed in the stop element forming unit B (note Figs. 4 and 16). It will be understood from the foregoing that a unit length of tape will be fed to unit B during each upward stroke of the rack 25 and ram 18 and during each revolution of the crankshaft 17.

The wire feeding device D is contained in the base 24 of the machine frame beneath plate 27 and the forming unit B (note Figs. 1 and 9) and its operation is controlled by a ratchet device actuated from the crankshaft 17. As shown in Figs. 1 to 3, the shaft 17 has connected to one end thereof an eccentric 55 to which is pivotally connected one end of an arm 56. The other end of arm 56 is pivotally connected to a pawl carrier 57 at a point offset from the pivotal axis of such carrier. As shown more clearly in Figs. 2, 10 and 11, the carrier 57 is rotatably mounted on an enlarged portion of a shaft 58 extending through a bearing support 59 secured to a plate 60 attached to the frame. The carrier 57 is provided intermediate its point of connection with arm 56 and shaft 58, with a pawl 61 adapted to engage the teeth of two adjacent ratchets 62 and 63. The pawl 61 is normally maintained in engagement with the teeth of both ratchets by a spring pressed pin 64 provided on the carrier 57. It will thus be noted that as the crank constituted by the eccentric 55 and arm 56 is actuated by shaft 17, the carrier 57 is oscillated about shaft 58. During the downward movements of carrier 57 in each cycle of movement of shaft 17, the pawl 61 is withdrawn over a tooth of both of the ratchets 62 and 63, while in the upward movements of carrier 57 the pawl steps the ratchets about shaft 58, one step during each cycle of shaft 17.

Figure 10:
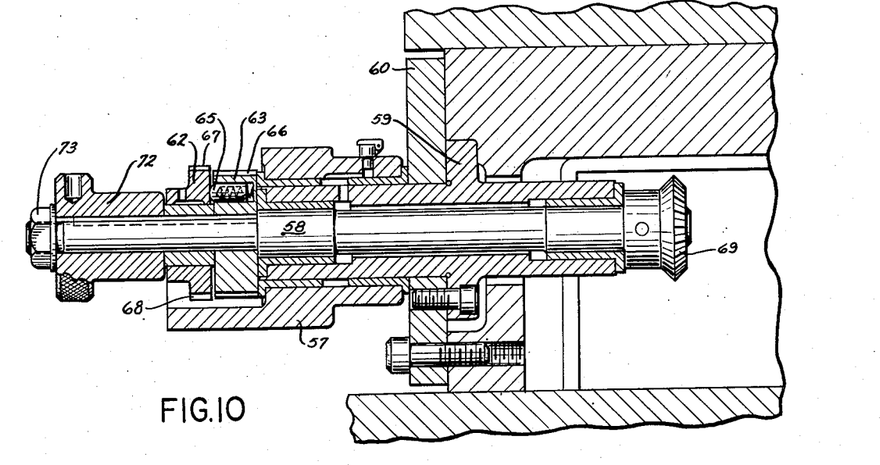
Fig. 10 is a sectional view taken along the line 10—10 of Fig. 2 and showing the wire feed ratchet mechanism in vertical section.
Figure 11:
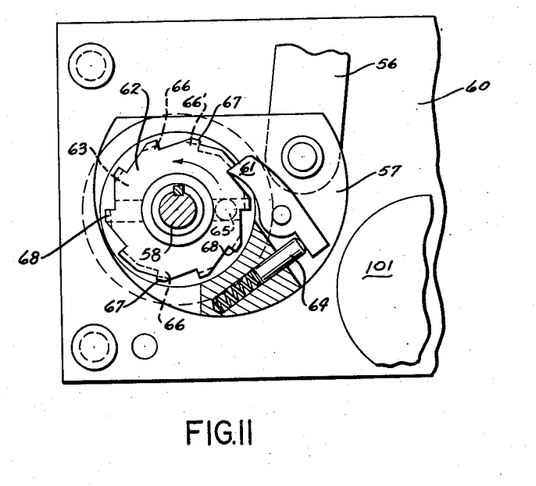
Fig. 11 is an enlarged elevational view, partly in section, of the wire feed ratchet mechanism.

Ratchet 63 is keyed to shaft 58 so that as it is intermittently advanced by pawl 61, the shaft 58 is intermittently rotated. Ratchet 62 is mounted for free rotational movement on shaft 58 but is prevented from doing so by a spring pressed plunger 65 carried by ratchet 63 and engaging the inner face of ratchet 62 (note Fig. 10). Ratchets 62 and 63 are each provided with ten teeth, as shown in Fig. 11, but while the depths of the teeth 66 of ratchet 63 are uniform, two diametrically opposite teeth 67 of ratchet 62 have a depth which is less than the depth of the remaining teeth 68 of such ratchet by at least the depth of teeth 66. The teeth 66 of ratchet 63 and the eight teeth 68 of ratchet 62 have their bases on the same root line, but teeth 68 have a greater depth than teeth 66 so that they project beyond the latter (compare Figs. 10 and 11). The two diametrically opposite teeth 67 of ratchet 62 project from the root line of teeth 68 the same distance as teeth 68, but their depth is less than that of teeth 68 to the extent that the root line of these two teeth is at a distance from the axis of shaft 58 greater than the distance of the line defined by the outer surfaces of teeth 66. Thus when pawl 61 comes into abutting relation with either of teeth 67 it will be prevented from coming into abutting relation with the paired tooth 66 of ratchet 63. As a result of this ratchet construction, when the pawl 61 in its advancing movements engages paired teeth 66 and 68, ratchets 63 and 62, respectively, will be simultaneously advanced and through ratchet 63, shaft 58 will be advanced. As there are two sets of four teeth 68 between the teeth 67 of ratchet 62, the shaft 58 will be advanced four steps before the pawl comes into engagement with a tooth 67 which prevents it from engaging the tooth 66 paired therewith. On the next advancing movement of pawl 61 the pawl will advance tooth 67 but will not move the paired tooth 66, which for the sake of explanation is indicated 66' in Fig. 11 of the drawings. Consequently, the shaft 58 will not be rotated during this movement of pawl 61. When the pawl is next advanced, it will engage the tooth 66' and the first tooth 68 which is in back of said tooth 67 and which was advanced into paired relation with tooth 66' during the preceding movement of pawl 61, to again advance shaft 58. It will thus be seen that in the operation of this mechanism the shaft 58 will be caused to dwell after every fourth cycle of shaft 17. Inasmuch as each rotational step of shaft 58 represents an increment in advance of the wires 7, 7′ and the placement of a pair of stop members 2, 2′ on the track, and as the tape 1 is advanced during each cycle of movement of shaft 17, a double space of tape will be provided after every fourth pair of fastener members is placed on the tape.

Figure 9:
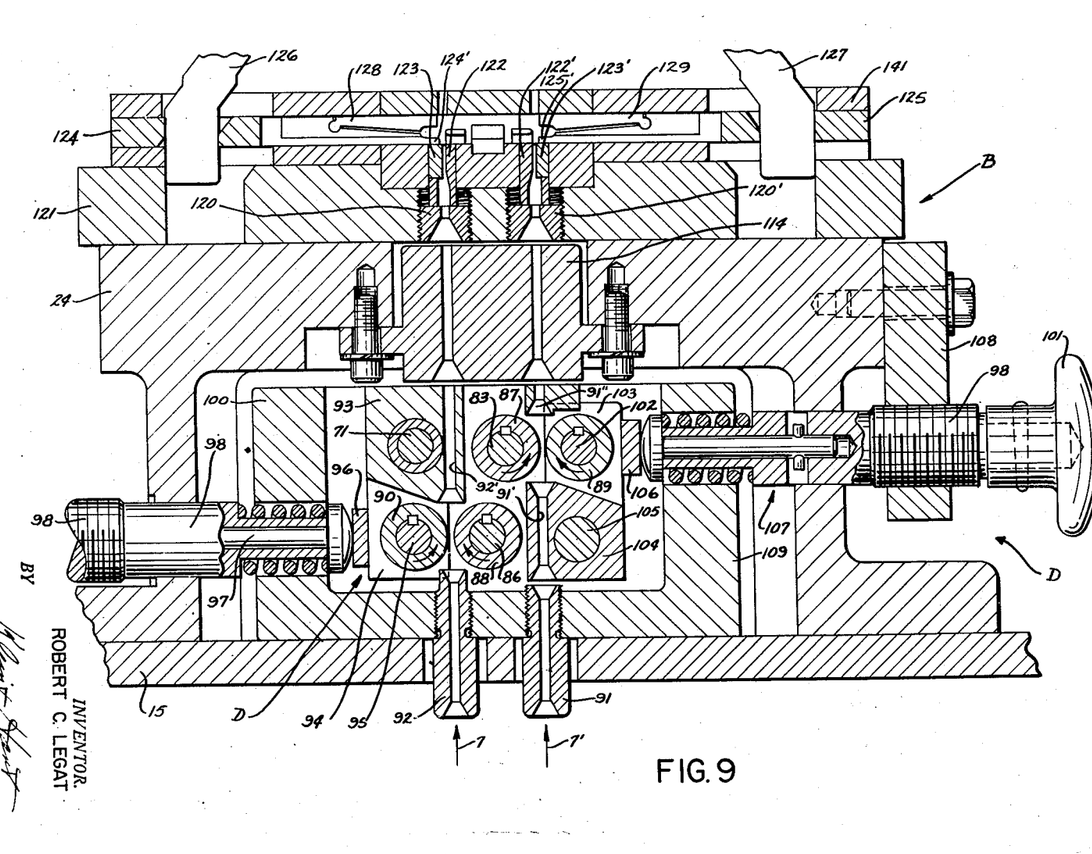
Fig. 9 is a sectional view taken along the line 9—9 of Fig. 2 and showing the wire feed and forming units in vertical section.
Figures 12, 12A:
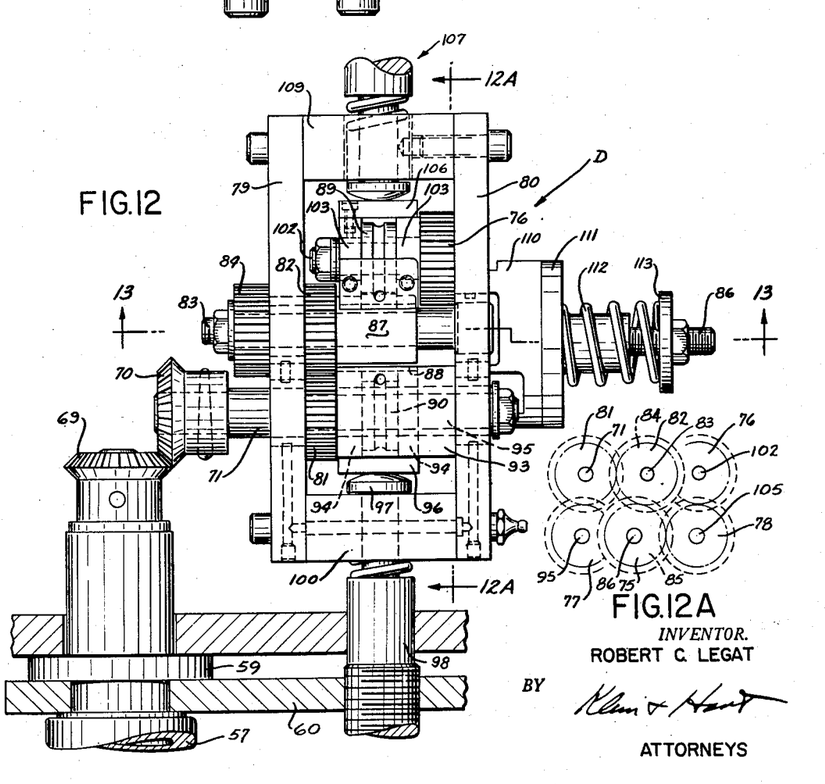
Fig. 12 is a top plan view of the wire feed unit driven by the ratchet mechanism.
Fig. 12A is a sectional view taken along the line 12A—12A of Fig. 12.
Figure 13:
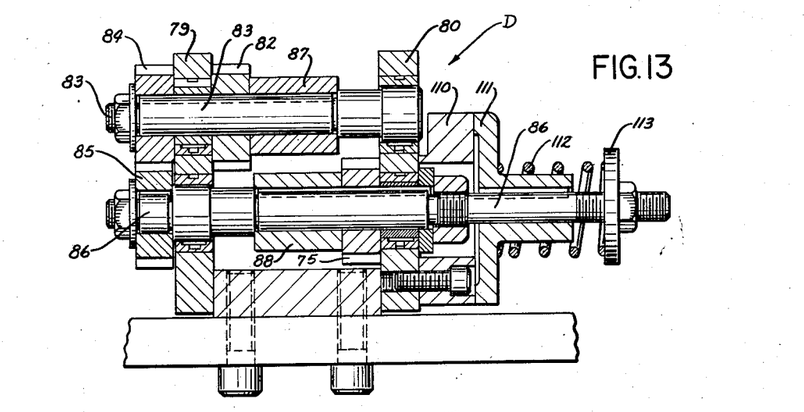
Fig. 13 is a transverse vertical section taken along the line 13—13 of Fig. 12.

The shaft 58 is connected to the wire feeding device D by a bevel gear 69 which is in engagement with a bevel gear 70 mounted on shaft 71 of such device (note Figs. 9, 12 and 13). Shaft 58 and gear 69, carrier 57 and ratchets 62, 63 are maintained in proper assembled relation on bearing support 59 by a hand knob 72 and a nut 73 threadedly engaging the outer end of shaft 58. Shaft 71 is rotatably mounted on the rear and front plates 79 and 80 respectively, of the housing for the wire feeding mechanism. Secured to shaft 71 adjacent to the inner side of wall 79 is a gear 81 which is in mesh with a gear 82 secured to a shaft 83 arranged in parallelism with shaft 71 and also rotatably supported by the housing walls 79, 80. Exteriorly of wall 79, shaft 83 has secured thereto a gear 84 which is in mesh with a gear 85 to the rear end of a shaft 86 arranged in parallelism below shaft 83 and likewise rotatably supported by the walls 79, 80 of the housing. It will thus be seen that by the aforesaid arrangement of gearing, shaft 58 will impart to shafts 71, 83 and 86 the same intermittent rotational movements impressed on shaft 58 by the previously described ratchet control mechanism, i. e., four advancing steps and a dwell for every five cycles of movement of shaft 17. Shafts 83 and 86 are provided with flat feed rollers 87 and 88, respectively, each of which cooperates with a grooved feed roller to feed a wire. As shown, flat feed roller 87 coacts with grooved feed roller 89 to feed wire 7′ and flat feed roller 88 coacts with grooved feed roller 90 to feed wire 7. It will be noted from Fig. 9 of the drawings, that the peripheral surface of flat roller 87 is substantially tangential to the longitudinal centerline of wire guides 91, 91′ and 91″ through which the wire 7′ is fed by rollers 87, 89, the latter being positioned intermediate wire guides 91′, 91″ to draw the wire from the reel 8′ through guides 91, 91′ and to feed such wire forwardly through the guide 91″. In a similar fashion the peripheral surface of flat roller 88 is substantially tangential to the longitudinal centerline of the wire guide 92 through which the wire is drawn by rollers 88, 90, from reel 8, and to the longitudinal centerline of the wire guide 92′ through which the rollers 89, 90 advance the wire. The grooved rollers 89, 90 are placed under substantial spring tension so that each wire is positively gripped by its associated pair of rollers to insure positive accurate feeding of uniform unit lengths of the wire to the stop element forming unit B.

Between gear 81 and the front housing wall 80, shaft 71 extends through and pivotally supports a yoke 93, the arms 94 of which rotatably support shaft 95 to which the grooved roller 90 is secured. Shaft 95 has also secured thereto a gear 77 which is shown in dotted outline in Fig. 12A and which is in engagement with gear 81 so that such shaft and grooved roller 90 are driven by shaft 71. Secured to the outer sides of yoke arms 94 is a crossplate 96 against which bears the head of a spring loaded plunger 97 provided on the inner end of an adjusting screw 98 threaded through a bracket plate 99 secured to the frame of the machine (note Fig. 1) and extending through the side wall of the frame base 24 and the end wall 100 of the feed unit housing. The screw 98 is provided on its outer end with a hand knob 101 by which the pressure of the grooved roller 90 against the wire 7 may be adjusted. In a similar fashion, the shaft 102 to which the grooved roller 89 is attached is rotatably supported by the arms 103 of a yoke 104 secured to a shaft 105 rotatably supported by the housing walls 79, 80. Yoke 104 is in a reversed position with relation to yoke 93 because roller 87 is above roller 88. The arms of yoke 104 are also biased about the axis of shaft 105 by a spring loaded adjusting unit bearing against a cross plate 106 thereon. The adjusting unit which is generally designated in Fig. 9 of the drawings by the numeral 107 is similar in construction to the previously described unit bearing against yoke 93 and is threadedly engaged with a bracket plate 108 mounted on the frame base 24, the unit extending through such plate, the right hand wall of the housing base 24, as viewed in Figs. 1 and 9, and the end wall 109 of the feed unit housing. By adjustment of the hand knob of unit 107 the pressure of the grooved roller 89 on wire 7′ may be adjusted to obtain the proper control of the feed of such wire so that it is fed in accurate uniform lengths in synchronism with the feed of wire 7. Secured to shaft 86 in front of the flat feed roller 88 is a gear 75 which is shown in phantom in Fig. 12A and which engages a gear 78 secured to shaft 105, also shown in phantom in Fig. 12A. The gear on shaft 105 in turn engages a gear 76 secured to shaft 102 on which is mounted the grooved feed roller 89. Thus roller 89 is positively driven by shaft 86 through gears 75, 78 and 76.

To assure greater accuracy in the feed of the wires 7, 7′, shaft 86 is made longer than the chain of shafts between such shaft and shaft 58 so that it projects substantially forwardly of the front housing wall 80. Encircling the projecting end of shaft 86 and secured to housing wall 80 is a brake ring 110 which is engaged by a brake disc 111 keyed to shaft 86. The brake disc is maintained engaged with the brake ring 110 under tension by a spring 112 which is seated on the brake disc 111 and against a washer 113 adjustably secured in position on shaft 86. As a result of this construction any chances of variation in the unit lengths of the wires fed due to slack or looseness which might otherwise develop in a chain of free gears such as herein employed between shafts 58 and 86, is eliminated by bringing the entire chain to a stop as soon as the driving force has been discontinued and by maintaining the parts constituting such chain on their stopped positions until positively driven again.

Figure 14:
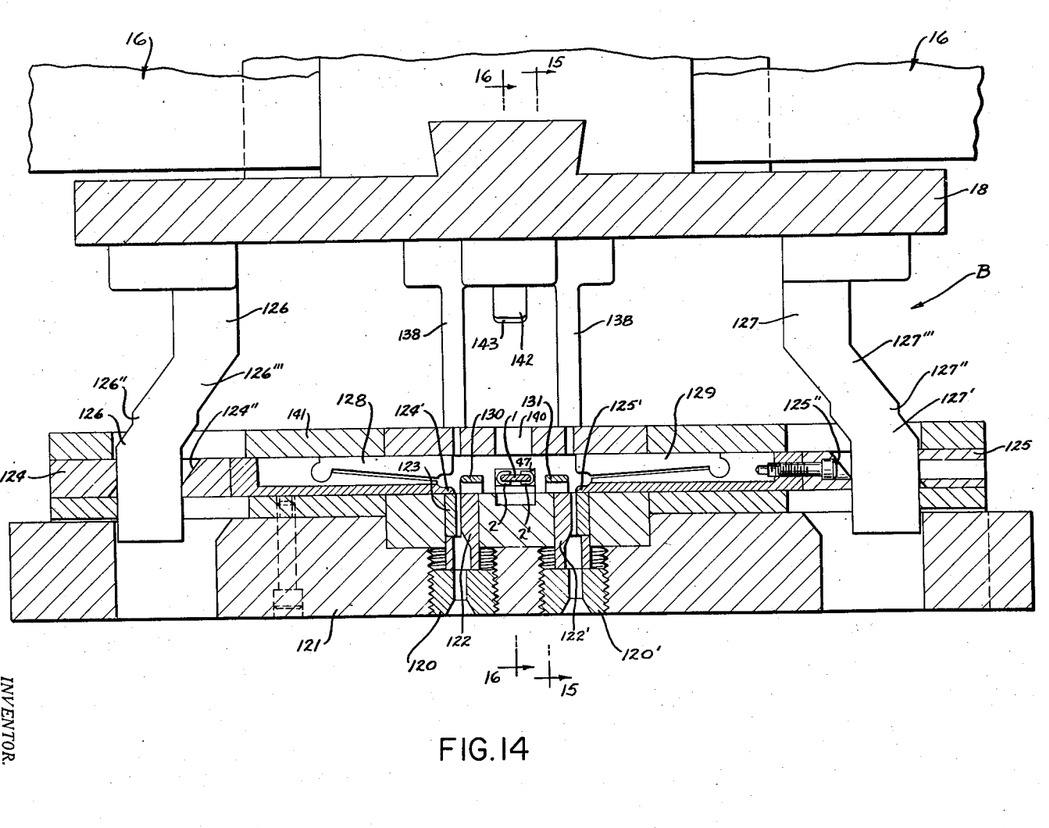
Fig. 14 is a vertical sectional view of the wire forming unit, the section being taken along the line 14—14 of Fig. 4 and showing the positions of the parts when the formed stop elements of the track have been deposited on the tape after the anvils in which such stop elements have been formed are retracted and the dies which form such stop elements on the anvils are drawn back to neutral position.
Figure 17:
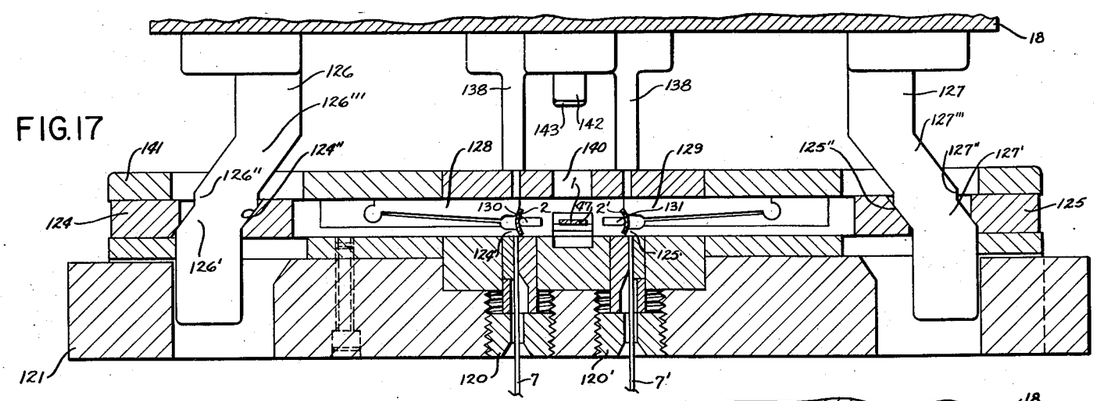
Fig. 17 is a view substantially similar to Fig. 14 but showing the positions of the parts in the start of the formation of a pair of stop elements on the anvils.
Figure 18:
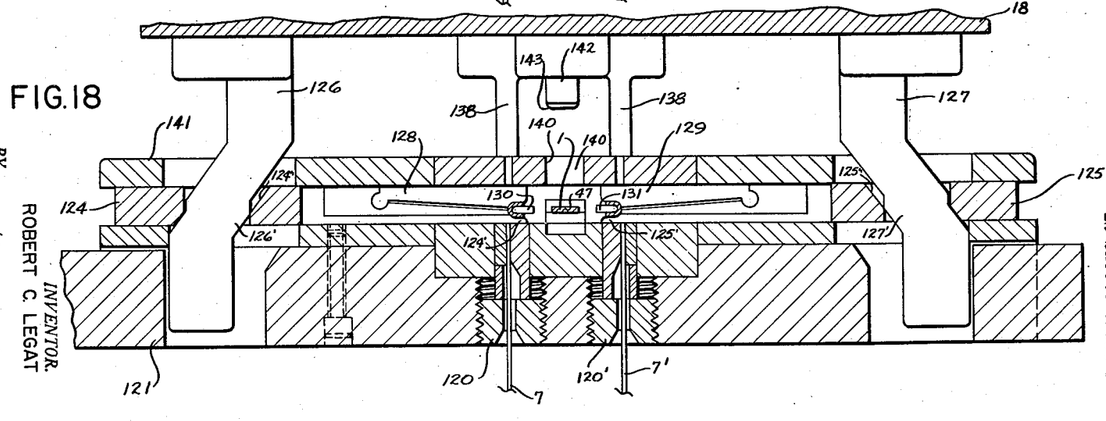
Fig. 18 is a similar view, but showing the positions of the parts at the completion of the formation of the stop elements.

The unit lengths of wire advanced by the pairs 87, 89 and 88, 90 of feeding rollers pass from the guides 91″, 92′ into and through guide passageways provided in a guide block 114 secured to the frame base 24 above the feeding unit D (note Fig. 9). From guide block 114 the advancing ends of the wire pass up into a pair of guide members 120, 120′ threadedly secured in the base plate 121 of the forming unit B. The members 120, 120′ guide the wires into passageways formed between shear dies 122, 122′ and guides 123, 123′. The upper ends of such passageways are entirely contained in the guides 123, 123′ and closely conform in cross-sectional area to the cross-sectional areas of the wires 7, 7′; the curved walls of the wires engaging the curved grooves in guides 123, 123′ and the flat walls of the wires sliding along the flat surfaces of the dies 122, 122′ forming such passageways. Thus as the wires 7, 7′ emerge from these passageways the flat sides or walls thereof are in opposed relation. Mounted for reciprocal movement across the discharge ends of the passageways formed by dies 122, 122′ and guides 123, 123′, are a pair of slides 124, 125 actuated by cams 126, 127, respectively, provided on the ram 18 (note Figs. 1 and 14). The slides include knife portions 124′, 125′ which coact with the shear dies 122, 122′, respectively, to cut off the end portions of the wires 7, 7′, respectively, projecting up out of the passageways formed by dies 122, 122′ and guides 123, 123′. As previously explained unit lengths of the wires 7, 7′ are fed by the wire feeding devices during the upward strokes of the ram 18. The cutting action of the slides occurs during the down or advancing stroke of the ram and while the cam portions 126′, 127′ are engaging cam surfaces 124″, 125″ on the slides to advance the slides toward each other (note Fig. 17). As the cam portions 126′, 127′ continue to advance the slides, the cut pieces of wire are carried by the slide knife portions 124′, 125′ and members 128, 129 hingedly mounted on slides 124, 125, respectively, toward and against a pair of spaced anvils 130, 131. The cut pieces of wire are bent around the anvils 130, 131 as the slides finish this portion of their stroke under the action of cam portions 126′, 127′ (compare Figs. 17 and 18). It will be noted that the operative ends of the knife portions 124′, 125′ and the hinged members 128, 129 are formed to provide in the forward ends of the slides recesses for receiving the wire pieces as they are being bent on the anvils so that at the end of the strokes of the slides the completely bent wire pieces will be wholly deposited in such recesses as shown in Fig. 18. During the continued downward movement of the ram and while the cam portions 126″, 127″ are passing through the slides, the latter will dwell in the said advanced positions, but the anvils 130, 131 will be withdrawn to leave the formed wire pieces in the slide recesses.

Figure 15:
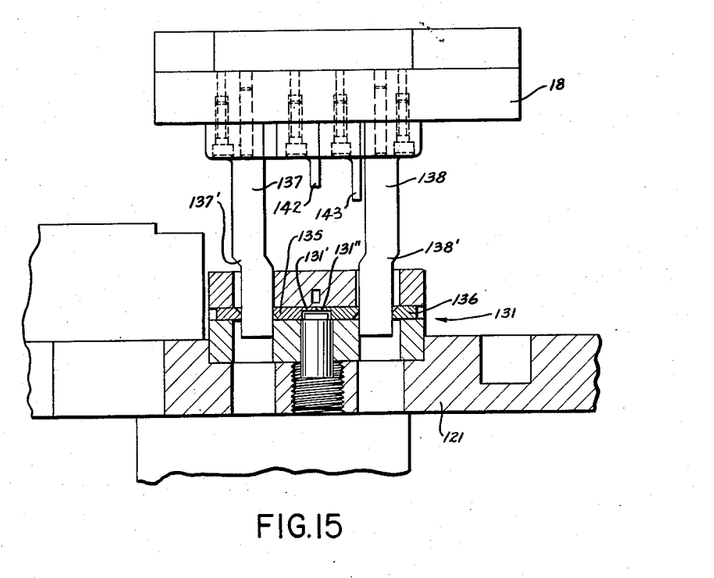
Fig. 15 is a sectional view of the anvil actuating means taken along the line 15—15 of Fig. 14.

As shown more clearly in Fig. 15 of the drawings which illustrates anvil 131 in greater detail, each anvil is composed of two parts provided on the opposed ends of a pair of slides controlled by two cams depending from the ram 18. With respect to the anvil 131 shown in Fig. 15, the parts thereof designated 131′, 131″ are provided on the opposing ends of two slides 135, 136, respectively, mounted for slidable movement in directions at right angles to the movements of slides 124, 125. Cooperating with cam surfaces on the slides 135, 136 are cams 137, 138, respectively, which are so formed that they maintain the slides in an advanced position with the anvil parts 131′, 131″ closed to form a complete anvil 131 during the initial downward movement of the ram and until the portions 126′, 127′ of cams 126, 127 respectively, have completed the initial advancement of slides 124, 125. While the portions 126″, 127″ of cams 126, 127 respectively, maintain the slides 124, 125 in dwell positions at the end of such advancement, portions 137′, 138′ of cams 137, 138, respectively, act to retract slides 135, 136 and the anvil parts 131′, 131″, thereby leaving the formed wire pieces in the recesses on the ends of the slides 124, 125. The cams 137, 138 will maintain the anvil parts retracted during the remainder of the downward movement of the ram 18. It will be understood that the anvil 130 and the parts associated therewith are constructed and arranged in a similar manner and perform their functions simultaneously with the corresponding parts of anvil 131.

As the ram 18 continues its downward movement, portions 126″′, 127″′ of cams 126, 127, respectively, coact with the cam surfaces 124″, 125″ of slides 124, 125, respectively, to further advance such slides towards each other to carry the formed wire elements toward the tape 1 so that they are inserted over the opposite side edges of such tape. When the formed elements 2, 2′ are fully inserted on the tape, the slides 124, 125 will be fully advanced and will dwell in such fully advanced positions during the remainder of the downward stroke of the ram 18. In such fully advanced position also, the forward ends of the slides will be located beneath an elongated opening 140 in the slide guide plate 141. As the ram continues its downward stroke, a punch 142 carried by the ram, will enter the opening 140 and engage the hinged members 128, 129 of the slides with sufficient pressure to pinch the formed wire elements 2, 2′ onto the tape 1. Simultaneously, a punch 143 carried by the ram adjacent to punch 142 will enter an opening 144 in plate 141 spaced to the rear of opening 140 the distance between the pair of elements 2, 2′ and engage both elements 2, 2′ of the previously attached pair to securely and permanently attach them to the tape 1 (note Fig. 16). Thus one pair of elements will be attached to the tape sufficiently by the punch 142 and hinge members 128, 129 to enable them to be fed to a position beneath the punch 143 which on the next cycle of the machine, permanently attaches them to the tape. On the next upward stroke of the ram, the slides 124, 125 will be withdrawn by the cams 126, 127, respectively, to the positions shown in Fig. 14; the cams 137, 138 will close the two parts of each anvil 130, 131, respectively, to ready them for the next pair of wire members to be formed thereon, and the tape 1 with the newly attached stop elements thereon will be advanced one step to bring such elements beneath the opening 144 as has been explained.

Figure 19:
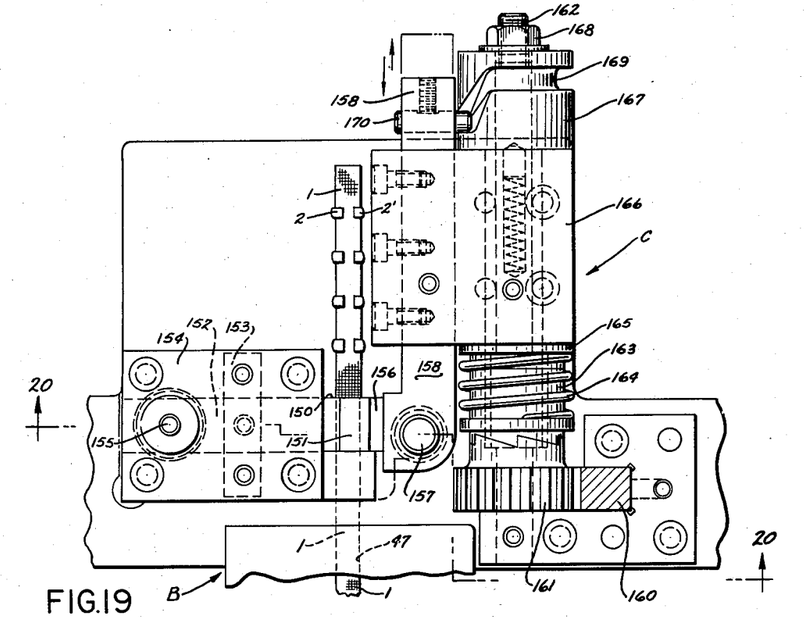
Fig. 19 is a top plan view of the unit for severing or shearing the tape of a completed track from the supply length of tape.
Figure 20:
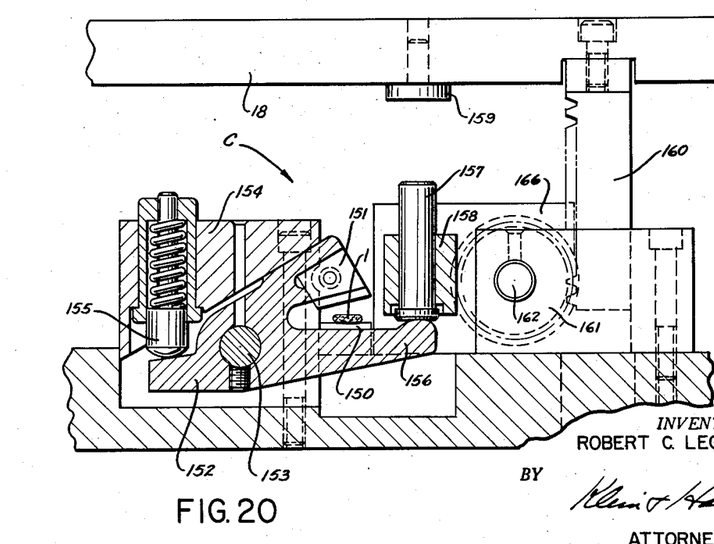
Fig. 20 is a vertical sectional view of the tape severing or shearing unit taken along the line 20—20 of Fig. 19.

In the step-by-step feed of the tape 1 with the pairs of stop elements 2, 2′ attached, such tape passes out of the discharge end of guideway 47 of the forming unit B and onto the fixed blade 150 of the tape severing unit C. As shown more clearly in Figs. 19 and 20, the movable blade 151 of such unit is mounted on an arm of a lever 152 secured to a shaft 153 supported for pivotal movement by the front and rear walls of a housing 154. The blade arm is normally maintained raised against the top inclined wall of the housing by a spring loaded plunger 155 mounted in the housing and engaging the end of lever 152. The lever is also provided with an arm 156 forming a rest for a pin 157 slidably mounted in one end of a slide 158. When the slide 158 is in an advanced position as shown in Figs. 19 and 20, the pin 157 is in the path of movement of a button 159 mounted on the ram 18. Thus when the ram 18 is lowered, button 159 will engage pin 157 and depress both pin 157 and lever arm 156 to cause lever 152 to rotate in a clockwise direction, as viewed in Fig. 20, against the tension exerted by the spring pressed plunger 155, and thereby cause knife 151 to cooperate with blade 150 to shear the tape 1. On the return movement of ram 18, the parts will be returned to their normal positions by the spring pressed plunger 155. However when the slide 158 is in a retracted position, the pin 157 will be out of the path of movement of the button 159 so that the ram 18 will complete its cycle of movement without actuating the knife blade 151.

The means for advancing and retracting the slide 158 includes a depending rack 160 which is secured to the ram 18 and engages a ratchet gear 161 rotatably mounted on a shaft 162. Slidably mounted on and keyed to shaft 162, is a ratchet 163, the teeth of which are pressed into engagement with the ratchet teeth of gear 161 by a spring 164 seated between a bead on ratchet 163 and a washer 165 held in position on shaft 162 against the thrust of spring 164 by a guide block 166. It will be noted that the ratchet teeth are designed so that the rack 160 will drive shaft 162 only on the upward or retracting movements of ram 18. The guide block or slide housing 166 is secured to a bushing mounted on shaft 162 between the washer 165 and a barrel or cylindrical cam 167, and slidably supports the slide 158 for reciprocal movement in directions parallel to the axis of shaft 162. The cam 167 is likewise keyed to shaft 162 and is held in position thereon by the slide housing and a nut 168. Cam 167 is provided with a cam groove 169 which is engaged by a pin 170 secured to slide 158. The groove 169 is so designed that during three cycles of shaft 17, the ram 18 will step the shaft 162 and cam 167 around without advancing slide 158 from its retracted position. On the fourth cycle of shaft 17, however, and while the ram is being retracted the cam 167 will advance slide 158 to position the pin 157 in alignment with the button 159 on ram 18. When the ram next advances on the fifth cycle of shaft 17, button 159 will engage pin 157 and cause a cutting action of the blades 150, 151 in the manner previously explained. On the return stroke of ram 18 in the fifth cycle of shaft 17, cam 167 will retract slide 158 to remove pin 157 from the path of movement of button 159. The mechanism of the tape shear unit C should be coordinated with the ratchet control mechanism of the wire feeding device D so that the knives will be actuated only when the portions of the tape from which the stop elements have been omitted come into the field of action of the cutting knives 150, 151.

It is believed that the operation of the machine will be understood from the foregoing description of the same, but it might be briefly pointed out that the machine is operatively connected to the continuously running motor 21 and put in operation by actuating the clutch handle 23. As the shaft 17 rotates, the ram 18 is reciprocated vertically in the guides formed in the frame of the machine. The operations of tape feed unit A, wire feeding device D, stop element forming unit B and tape severing unit C are all controlled by the reciprocating ram. During the upward strokes of the ram, units A and D are actuated to feed predetermined uniform lengths of the tape 1 and of the wires 7, 7' from their sources of supply, and unit C is conditioned so that on the next downward stroke of the ram the tape will be severed to provide a finished track. As previously explained the tape feed unit A advances a uniform length of tape 1 during each upward stroke of the ram 18 without interruption, the tape intermittently advancing in uniform lengths from the feed rolls 40, 46 into guideway 47 of the forming unit B and through the latter to the knives of the severing unit C. In its step-by-step advancement through unit B, and during the periods of dwell thereof, spaced series of four pairs of stop elements 2, 2' are attached to the tape. The wires 7, 7' from which the stop elements are formed, are fed into unit B by the pair of feed rolls 88, 90 and the pair of feed rolls 87, 89, respectively. As explained, these feed rolls are actuated to feed equal lengths of the wires forwardly during four successive cycles of shaft 17 on the upward thrusts of ram 18 while on each fifth cycle such rolls are inoperative to feed the wires forwardly because a control ratchet 62 renders the ram unable to advance the feeding ratchet 63 in each fifth cycle. As a result, during each fifth cycle of operation of the forming mechanism, there will not be supplied unit lengths of the wires 7, 7' to such forming mechanism and the latter will go through such cycle of operations without forming stop elements and attaching them to the tape. Thus a distance equal to two spaces between pairs of elements in a series will be provided between the series of elments attached to the tape. As explained when the tape reaches the severing unit C, the tape will be severed by the knives of such unit at the center of such distance.

The formation of the stops 2, 2' from the wires 7, 7', respectively, and the attachment of such stops to the side edges of the tape occur during the downward strokes of the ram 18. The slides 124, 125 for severing off the lengths of wires to form the stops and carry them to the tape are controlled by the cams 126, 127, respectively, carried by the ram 18. The anvils 130, 131 on which the stops are formed by the slides 124, 125 are controlled by the cams 137, 138 carried by the ram 18, and the punches 142, 143 for attaching the stops to the tape 1 are also carried by the ram 18. During each downward movement of the ram 18, the two working parts of each of the anvils 130, 131 are initially maintained in closed, operative relation and the slides 124, 125 are retained in retracted positions. By this time the tape 1 has been advanced for the attachment of the new stops and sufficient wire has been fed up through the guides 123, 123' for the formation of such stops. As the ram 18 moves down, the slides 124, 125 are first actuated to coact with the shear dies 122, 122' to cut off the wire lengths for the stops and then to bend such wire lengths around the mandrels 130, 31, the bent lengths of wire being forced into the recesses formed in the forward ends of the slides. With the slides 124, 125 dwelling in this position, the two working parts of each anvil are then withdrawn from engagement with the bent wires and from the path of movement of the slides as the ram continues its downward movement. The anvils shall be maintained inoperative throughout the remainder of the downward movement of ram 18. However, just after such anvils are separated, the slides 124, 125 are further advanced toward each other to carry the bent stops to the side edges of the tape 1 and while the slides dwell in this advanced position during further downward movement of the ram, punch 142 will engage the hinge members 128, 129 on such slides and squeeze the stops upon the tape. Due to the reduction in vertical dimensions of the stops and the gripping action exerted thereby on the tape as a result of this operation, the stops will be left upon the tape as the slides are withdrawn during the retraction of ram 18. On the next downward movement of ram 18 and after the tape with the newly attached stops has been advanced one step in guideway 47, punch 143 will engage such stops and permanently attach them to the tape. During the retraction of ram 18, the cams 137, 138 controlling the anvils 130, 131 will close the two working parts of each anvil after the slides 124, 125 have been withdrawn from between such separated parts.

While I have hereinabove described and illustrated a preferred form of my invention, it will be apparent to those skilled in the art that various changes and modifications may be made therein without departing from the spirit of the invention or the scope of the appended claims.

I claim:

1. In apparatus for forming fastener elements on tape, means for feeding a tape past an attaching station, means for feeding an end of a supply length of wire to said station, at right angles to and in spaced relation with one edge of the tape an anvil located at said station between said tape and said wire, means supporting said anvil for movement substantially parallelly to such edge of the tape, means for cutting off a piece of the wire and forming it into an element on said anvil, means supporting said cutting and forming means for reciprocating movement transversely to said wire and anvil, said cutting and forming means having on its advancing end a recess to receive the element formed on said anvil, means to withdraw said anvil from between the formed element and the tape, leaving the former in the recess on the cutting and forming means, means to advance said cutting and forming means through the place occupied by the anvil during the forming operation to place the element on the tape, and means for securing the element to the tape while the cutting and forming means is in such advanced position.

2. In apparatus for forming fastener elements on tape, a movable anvil located at a forming and attaching station and having an edge on which a piece of wire may be bent to U-shape form, means supporting said anvil for movement substantially parallelly to such edge, means for feeding a tape past said anvil in aligned parallelism with and in back of such edge, means for feeding an end of a supply length of wire in front of and transverse to such anvil edge, means for cutting off a piece of the wire and bending it on said edge to form a U-shaped element on said anvil, means supporting said cutting and forming means for reciprocating movement transversely to the direction of movement of said anvil, said cutting and forming means having on its advancing end a recess to receive the elements formed on said anvil, means to withdraw said anvil from between the formed element and the tape, leaving the former in the recess on the cutting and forming means means to advance said cutting and forming means through the place occupied by the anvil during the forming operation to place the element on the tape, and means for securing the element to the tape while the cutting and forming means is in such advanced position.

3. In apparatus for forming fastener elements on tape, a movable anvil located at a forming and attaching station and having an edge on which a piece of wire may be bent to U-shape form, means supporting said anvil for movement substantially parallelly to such edge, means for feeding a tape past sand anvil in aligned parallelism with and in back of such edge, means for feeding an end of a supply length of wire in front of and transverse to such anvil edge, means for cutting off a piece of the wire and bending it on said edge to form a U-shaped element on said anvil, means supporting said cutting and forming means for reciprocating movement transversely to the direction of movement of said anvil, said cutting and forming means including on its advancing end a cutting member fixed with relation to said means, and a forming member movable relative to said cutting member, said cutting and forming members cooperating with said anvil to form the element and providing a recess therebetween to receive the element formed on the anvil, means for restricting movement of said movable member away from said cutting member during the formation of the element, means to withdraw said anvil from between the formed element and the tape, leaving the former in the recess formed between the cutting and forming members means to advance said cutting and forming means through the place occupied by the anvil during the forming operation to place the element on the tape, and means engageable with said movable member to cause the latter to move toward said fixed member to clamp the element carried in the recess therebetween to the tape while the cutting and forming means is in such advanced position.

4. In apparatus for forming fastener elements on tape, an anvil located at a forming and attaching station and composed of two movable parts coacting to form an edge on which a wire may be bent to U-shape form, means supporting said anvil parts for movement toward and away from each other substantially parallelly to such edge, means for feeding a tape to said station and past said anvil in aligned parallelism with and in back of such edge, means for feeding an end of a supply length of wire in front of and transverse to such anvil edge, cutting and forming means cooperable with said anvil, means supporting said cutting and forming means for reciprocating movement transverse to said anvil edge and said tape, means for advancing said cutting and forming means to cut off a piece of the wire and bend it on said anvil edge to U-shaped form, said cutting and forming means having on its advanced end a recess to receive the element formed on said anvil, means to withdraw the two parts of said anvil forming said anvil edge leaving the element in the recess on said cutting and forming means, said advancing means being operative following the withdrawal of such anvil parts to further advance said cutting and forming means through the space provided between the separated parts of said anvil to place the element on the tape, and means for securing the element to the tape while the cutting and forming means is in such advanced position.

5. In apparatus for forming fastener elements on tape, means for feeding a tape past an attaching station, means for feeding the ends of two supply lengths of wire transversely of and to both sides of the tape at said station, a pair of anvils located in spaced relation at said station and between said tape and said wire ends, means supporting said anvils for parallel movement substantially parallel to the sides of the tape, means for simultaneously cutting off pieces of the wire and forming them into elements on said anvils, said cutting and forming means comprising two pairs of associated cutting and forming members, means supporting each pair of cutting and forming members for reciprocating movement transversely to said wire and anvils and in opposed relation to the other pair thereof, each pair of said cutting and forming members having a recess formed between the advancing ends thereof to receive the elements formed on said anvils, means to withdraw said anvils from between the formed elements and the tape leaving the former in the recesses formed between the pairs of cutting and forming members, means to advance said pairs of cutting and forming members toward each other and through the places occupied by the anvils during the forming operation to place the elements on opposite edges of the tape, and means for simultaneously securing both elements to the tape while the pairs of cutting and forming members are in such advanced position.

6. In apparatus for forming fastener elements on tape, means for feeding a tape past an attaching station in a step-by-step fashion, means for intermittently feeding unit lengths of wire to said station at right angles to one edge of the tape, driving means for intermittently actuating said tape feeding and wire feeding means, means for rendering said driving means inoperative to actuate said wire feeding means at predetermined intervals during the operativeness of the tape feeding means, an anvil located at said station between the tape and wire, means supporting said anvil for movement substantially parallelly to such edge of the tape, means operative during the periods of dwell of said wire feeding means to cut off such unit lengths of the wire at said station and form them into fastener elements on said anvil, means supporting said operative means for reciprocal movement transversely to the direction of movement of said anvil, the advancing end of said operative means having a recess to receive the elements formed on said anvil, means to withdraw said anvil from between the formed element and the tape leaving the former in the recess of the operative means, means for advancing said operative means during each period of dwell of the wire feeding means to enable such operative means initially to cut and form an element and then to carry such element through the place occupied by the anvil during the forming operation and place it in position on said tape, and means for securing the elements placed on the tape while said operative means is in such advanced position, said last mentioned means including a movable member carried by said operative means and means for actuating said member.

7. In apparatus for forming fastener elements on tape, means for feeding a tape past an attaching station in a step-by-step fashion including reciprocating means, a pair of driven feed rollers engaging the tape, means for rotating said rollers to advance the tape, means connecting said reciprocating means to said rotating means and operable to drive the latter during the movement of said reciprocating means in one direction, means for intermittently feeding unit lengths of wire to said station at right angles to one edge of the tape, during the advancing steps of said tape, means for rendering said wire feeding means inoperative to advance a unit length of wire at predetermined intervals without effecting the operativeness of said tape feeding means, an anvil located at said station between the tape and wire, means supporting said anvil for movement substantially parallelly to such edge of the tape, means operative during the periods of dwell of said wire feeding means to cut off such unit lengths of the wire at said station and form them into fastener elements on said anvil, means supporting said operative means for reciprocal movement transversely to the direction of movement of said anvil, the advancing end of said operative means having a recess to receive the elements formed on said anvil, means to withdraw said anvil from between the formed element and the tape leaving the former in the recess of the operative means, means for advancing said operative means during each period of dwell of the wire feeding means to enable such operative means initially to cut and form an element and then to carry such element through the place occupied by the anvil during the forming operation and place it in position on said tape, and means for securing the elements placed on the tape while said operative means is in such advanced position, said last mentioned means including a movable member carried by said operative means and means for actuating said member.

8. In apparatus for forming fastener elements on tape, means for feeding a unit length of tape to an attaching station in each cycle of the apparatus, means for feeding a unit length of wire to said station at right angles to one edge of the tape during a cycle of the apparatus, controlling means for rendering said wire feeding means inoperative to feed a unit length of wire in one of a predetermined number of such cycles, an anvil located at said station between the tape and wire fed thereto, means supporting said anvil for movement substantially parallelly to such edge of the tape, means for cutting off a unit length of the wire fed to such station, forming it into a fastener element and placing it in position on said tape during a cycle of the apparatus, means supporting said cutting and forming means for reciprocating movement across the path of movement of said anvil, said cutting and forming means having on its advancing end a recess to receive the element formed on said anvil, means to withdraw said anvil from a formed element held by said cutting and forming means, means to advance said cutting and forming means during said cutting and forming operations, to cause the same to dwell during the withdrawal of said anvil, and to advance the same further through the place occupied by the anvil during the forming operation to position the element on the tape, and means for securing the formed element placed on the tape, said last mentioned means including a movable forming member carried by said cutting and forming means and means for actuating said member.

9. In apparatus for forming fastener elements on tape, means for feeding a unit length of tape to an attaching station in each cycle of the apparatus, means for feeding a unit length of wire to said station at right angles to one edge of the tape during a cycle of the apparatus including reciprocating means, a pair of driven feed rollers engaging the supply length of wire, and means actuated by said reciprocating means to cause said feed rollers to feed a unit length of wire, means between said reciprocating means and said actuating means to prevent the latter operating said feed rollers to feed a unit length of wire in one of a predetermined number of such cycles, an anvil located at said station between the tape and wire fed thereto, means supporting said anvil for movement substantially parallelly to such edge of the tape, means for cutting off a unit length of the wire fed to such station, forming it into a fastener element and placing it in position on said tape during a cycle of the apparatus, means supporting said cutting and forming means for reciprocating movement across the path of movement of said anvil, said cutting and forming means having on its advancing end a recess to receive the element formed on said anvil, means to withdraw said anvil from a formed element held by said cutting and forming means, means to advance said cutting and forming means during said cutting and forming operations, to cause the same to dwell during the withdrawal of said anvil, and to advance the same further through the place occupied by the anvil during the forming operation to position the element on the tape, and means for securing the formed element placed on the tape, said last mentioned means including a movable member carried by said cutting and forming means and means for actuating said member.

10. In apparatus for forming fastener elements on tape, means for feeding a unit length of tape to an attaching station in each cycle of the apparatus, means for feeding a unit length of wire to said station at right angles to one edge of the tape during a cycle of the apparatus including reciprocating means, a pair of driven feed rollers engaging the supply length of wire, means actuated by said reciprocating means to positively drive both of said rollers to feed unit lengths of the wire, and means for maintaining said rollers engaged with the wire under pressure during the feeding operations thereof, an anvil located at said station between the tape and wire fed thereto, means supporting said anvil for movement substantially parallelly to such edge of the tape, means for cutting off a unit length of the wire fed to such station, forming it into a fastener element and placing it in position on said tape during a cycle of the apparatus, means supporting said cutting and forming means for reciprocating movement across the path of movement of said anvil, said cutting and forming means having on its advancing end a recess to receive the element formed on said anvil, means to withdraw said anvil from a formed element held by said cutting and forming means, means to advance said cutting and forming means during said cutting and forming operations, to cause the same to dwell during the withdrawal of said anvil, and to advance the same further through the place occupied by the anvil during the forming operation to position the element on the tape, and means for securing the formed element placed on the tape, said last mentioned means including a movable forming member carried by said cutting and forming means and means for actuating said member.

11. In apparatus for forming fastener elements on tape, a movable anvil located at a station, means supporting said anvil for movement into and away from its place of operation at said station, means for feeding a unit length of tape to said station in each cycle of the apparatus, means for feeding a unit length of wire to said station during a cycle of the apparatus, means for cutting from the supply length of wire a piece of unit length and for bending the same on said anvil to U-shaped form, means supporting said cutting and bending means for reciprocating movement across the path of movement of said anvil, said cutting and bending means having on its advancing end a member fixed with relation thereto and a member movable with relation thereto and coactable with said anvil to form the element and forming therebetween a recess to receive the element formed on said anvil, means to remove said anvil from the path of movement of said cutting and bending means leaving the formed element in such recess, means to advance said cutting and bending means through the place occupied by the anvil during the forming operation and past said anvil to position the element on the tape, and reciprocatable means operable while said cutting and bending means is in such advanced position to engage and press the movable member thereof towards the fixed member thereof and thereby to secure the element to the tape.

12. In apparatus for forming fastener elements on tape, a movable anvil located at a station, means supporting said anvil for movement into and away from its place of operation at said station, means for feeding a unit length of tape to said station in each cycle of the apparatus, means for feeding a unit length of wire to said station during a cycle of the apparatus, means for cutting from the supply length of wire a piece of unit length and including a stationary cutting die and a reciprocating knife coacting with said die, means supporting said knife for reciprocating movement past said die and across the path of movement of said anvil, a forming member movably mounted on said knife and coacting with the latter to bend the cut piece of wire on said anvil to U-shaped form, said knife and forming member providing a recess to receive the element formed on said anvil, means to remove said anvil from the path of movement of said reciprocating knife and forming member during a dwell in the operation of the latter to leave the formed element in such recess, means to advance said knife and forming member through the place occupied by the anvil during the forming operation and past said anvil to position the element on the tape, reciprocatable means for actuating said forming member while in such advanced position to cause said member and knife to squeeze and thereby secure the element to the tape.

13. In apparatus for forming fastener elements on tape, a movable anvil located at a station, means supporting said anvil for movement into and away from its place of operation at said station, means for feeding a unit length of tape to said station in each cycle of the apparatus, means for feeding a unit length of wire to said station during a cycle of the apparatus, means for cutting from the supply length of wire a piece of unit length and including a stationary cutting die and a reciprocating knife coacting with said die, means supporting said knife for reciprocating movement past said die and across the path of movement of said anvil, a forming member pivotably mounted on said knife and coacting with the latter to bend the cut piece of wire on said anvil to U-shaped form, means for restricting the pivotal movement of said forming member during such forming operation, said knife and forming member providing a recess to receive the element formed on said anvil, means to remove said anvil from the path of movement of said reciprocating knife and forming member during a dwell in the operation of the latter to leave the formed element in such recess, means to advance said knife and forming member through the place occupied by the anvil during the forming operation and past said anvil to position the element on the tape, reciprocating means operable on said forming member while in such advanced position to cause the latter to squeeze the element against said knife and thereby temporarily secure the element to the tape, and reciprocating means operable on the secured element to permanently attach it to said tape.

14. In apparatus for forming fastener elements on tape, means for feeding a unit length of tape to an attaching station in each cycle of the apparatus, means for feeding a unit length of wire to said station at right angles to one edge of the tape during a cycle of the apparatus, controlling means for rendering said wire feeding means inoperative to feed a unit length of wire in one of a predetermined number of such cycles, an anvil located at said station between the tape and wire fed thereto, means supporting said anvil for movement substantially parallelly to such edge of the tape, means for cutting off a unit length of the wire fed to such station, forming it into a fastener element and placing it in position on said tape during a cycle of the apparatus, means supporting said cutting and forming means for reciprocating movement across the path of movement of said anvil, said cutting and forming means having on its advancing end a recess to receive the element formed on said anvil, means to withdraw said anvil from a formed element held by said cutting and forming means, means to advance said cutting and forming means during said cutting and forming operations, to cause the same to dwell during the withdrawal of said anvil, and to advance the same further through the place occupied by the anvil during the forming operation to position the element on the tape, said cutting and forming means being prevented by said controlling means from placing a formed element on the tape in one of a predetermined number of said cycles, means including said cutting and forming means for securing the formed element placed on the tape, cutting means for severing the tape, and means controlling said tape cutting means and operable to cause the latter to cut the tape at the place where the cutting and forming means were prevented from placing a formed element thereon.

15. In apparatus for forming fastener elements on tape, means for feeding a unit length of tape to an attaching station in each cycle of the apparatus, means for feeding a unit length of wire to said station at right angles to one edge of the tape during a cycle of the apparatus, controlling means for rendering said wire feeding means inoperative to feed a unit length of wire in one of a predetermined number of such cycles, an anvil located at said station between the tape and wire fed thereto, means supporting said anvil for movement substantially parallelly to such edge of the tape, means for cutting off a unit length of the wire fed to such station, forming it into a fastener element and placing it in position on said tape during a cycle of the apparatus, means supporting said cutting and forming means for reciprocating movement across the path of movement of said anvil, said cutting and forming means having on its advancing end a recess to receive the element formed on said anvil, means to withdraw said anvil from a formed element held by said cutting and forming means, means to advance said cutting and forming means during said cutting and forming operations, to cause the same to dwell during the withdrawal of said anvil, and to advance the same further through the place occupied by the anvil during the forming operation to position the element on the tape, said cutting and forming means being prevented by said controlling means from placing a formed element on the tape in one of a predetermined number of said cycles, means including said cutting and forming means for securing the formed element placed on the tape, a cutting die located along the path of movement of the finished tape, a pivoted lever associated with said die and having an arm provided with a knife coactable with said die, means for normally maintaining said lever arm in retracted position, reciprocating means operable to actuate said lever during each cycle of the apparatus, cam means controlled by said reciprocating means to control the operableness of the latter, said cam means rendering said reciprocating means inoperative to actuate said lever to cause a cutting action except at those places on the tape where the cutting and forming means were prevented from placing a formed element thereon.

References Cited in the file of this patent

UNITED STATES PATENTS 1,966,256    Marinsky             July 10, 1934

FOREIGN PATENTS 138,776    Sweden              Oct. 30, 1952